March 31, 1964     J. D. McDANIELS, JR     3,127,050
PRESSURE VESSEL CONSTRUCTION Filed April 28, 1960     5 Sheets-Sheet 1

*INVENTOR.*
John D. Mc Daniels, Jr.
BY
ATTORNEY

March 31, 1964    J. D. McDANIELS, JR    3,127,050
PRESSURE VESSEL CONSTRUCTION
Filed April 28, 1960    5 Sheets-Sheet 2

INVENTOR.
John D. McDaniels, Jr.
BY
*J.P. Moran*
ATTORNEY

March 31, 1964    J. D. McDANIELS, JR    3,127,050
PRESSURE VESSEL CONSTRUCTION
Filed April 28, 1960    5 Sheets-Sheet 3

INVENTOR.
John D. McDaniels, Jr
BY
ATTORNEY

March 31, 1964   J. D. McDANIELS, JR   3,127,050
PRESSURE VESSEL CONSTRUCTION
Filed April 28, 1960   5 Sheets-Sheet 4

INVENTOR.
John D. Mc Daniels, Jr
BY
ATTORNEY

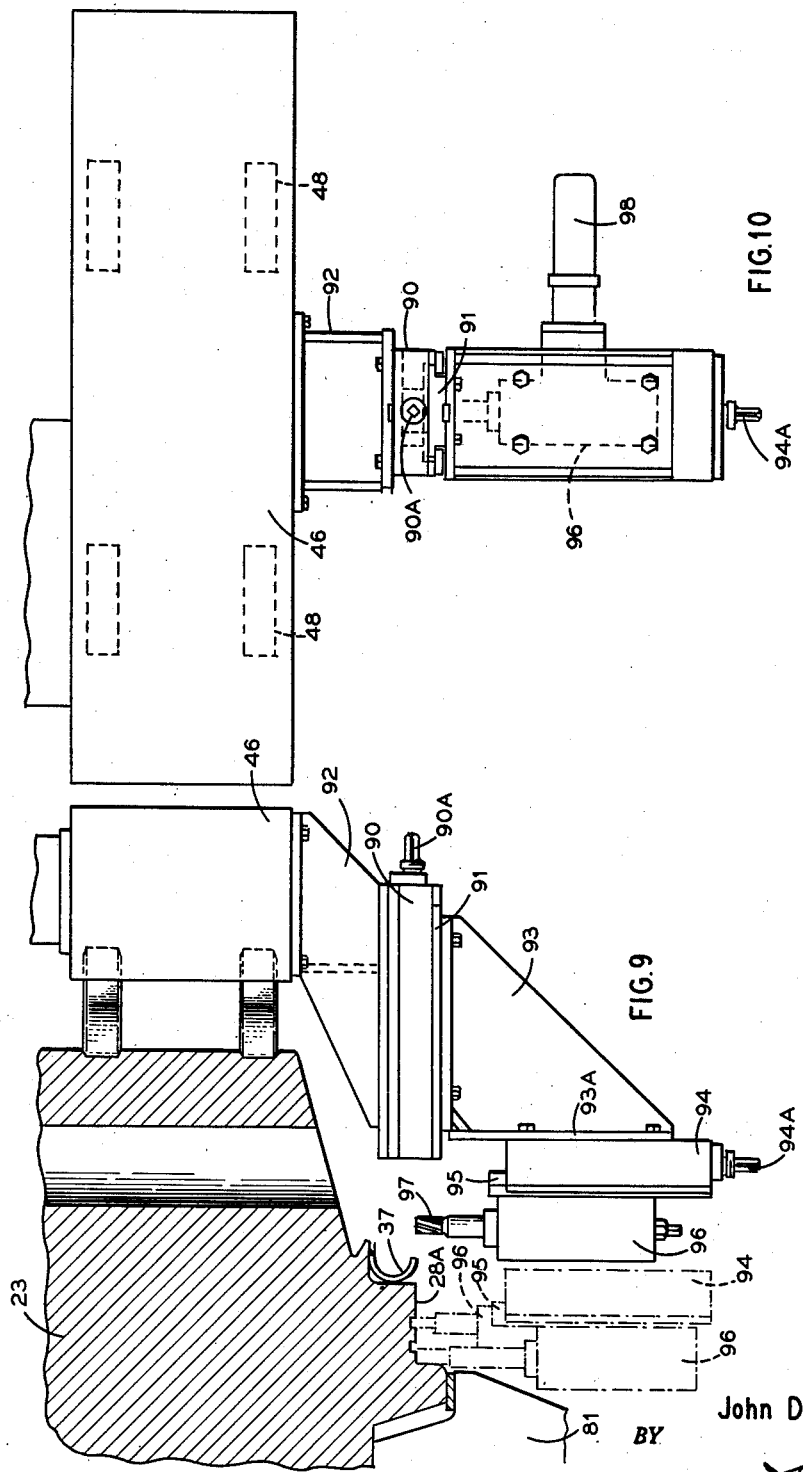

United States Patent Office 3,127,050
Patented Mar. 31, 1964

3,127,050
PRESSURE VESSEL CONSTRUCTION
John D. McDaniels, Jr., Lynchburg, Va., assignor to The Babcock & Wilcox Company, New York, N.Y., a corporation of New Jersey
Filed Apr. 28, 1960, Ser. No. 25,402
7 Claims. (Cl. 220—48)

This invention relates generally to a pressure vessel and more specifically to a high temperature, high pressure vessel having an absolutely fluid-tight, integrally formed seal about its closure junction in combination with means for facilitating the making and breaking of the seal.

In a number of present day processes utilizing high temperature, high pressure vessels, as for example a chemical or nuclear reactor and the like, it has become increasingly more important to provide an absolutely fluid-tight seal at the juncture of the vessel body and its closure. This is because the nature of the fluid contained in these pressure vessels is such that even a minimum amount of uncontrolled leakage will prove hazardous to both personnel and equipment. Therefore, it is absolutely essential to eliminate any uncontrolled leakage of a fluid therefrom. To attain this end it has been customary to form an absolutely fluid-tight seal by integrally attaching a metallic membrane about the juncture defined by the vessel body and closure members.

As it is generally necessary in processes employing such vessels to allow for access to the interior of the pressure vessels, it is important to provide means by which the integrally formed seal at the closure juncture may be readily broken and re-established. Breaking of such integrally formed seals is generally accomplished by cutting through or otherwise removing the sealing membrane with a suitable cutting or milling tool. Heretofore, this operation had been accomplished by clamping to the body of the vessel a track and securing to the track a milling machine or the like for cutting the integrally formed seal. However, experience has shown that the utilization of such a track for guiding the milling or cutting machine about the periphery of the vessel lacked the necessary accuracy to make a precision cut. Also the clamping of the guide track to the vessel each time the vessel required opening constituted a tedious and time-consuming operation; and further, necessitated the storing of the track when not in use.

Therefore an object of this invention is to provide in a pressure vessel of the type herein described, an integrally formed groove or track circumscribing the outer periphery of the vessel to form therein a permanent trackway adjacent the closure juncture to which a cutting tool may be secured and guided about the periphery of the vessel or its closure during a seal cutting operation.

Another object resides in a novel arrangement of a pressure vessel and a movably connected seal weld cutting machine guided and supported in a groove integrally formed on the outer surface of the vessel.

Still another object is to provide a cutting tool adapted to be supported and guided in integrally formed grooves with the versatility of either cutting the integrally formed seal and/or for spot refinishing the contacting or sealing surfaces of the vessel body and its closure.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:
FIG. 1 is a partial longitudinal sectional view of the pressure vessel of the character described and embodying the integrally formed tracking groove for supporting and guiding a seal weld cutting machine.

FIG. 9 is an enlarged detail of the modified form of the invention of FIG. 8.

FIG. 10 is an end view of FIG. 9.

Figure 1:
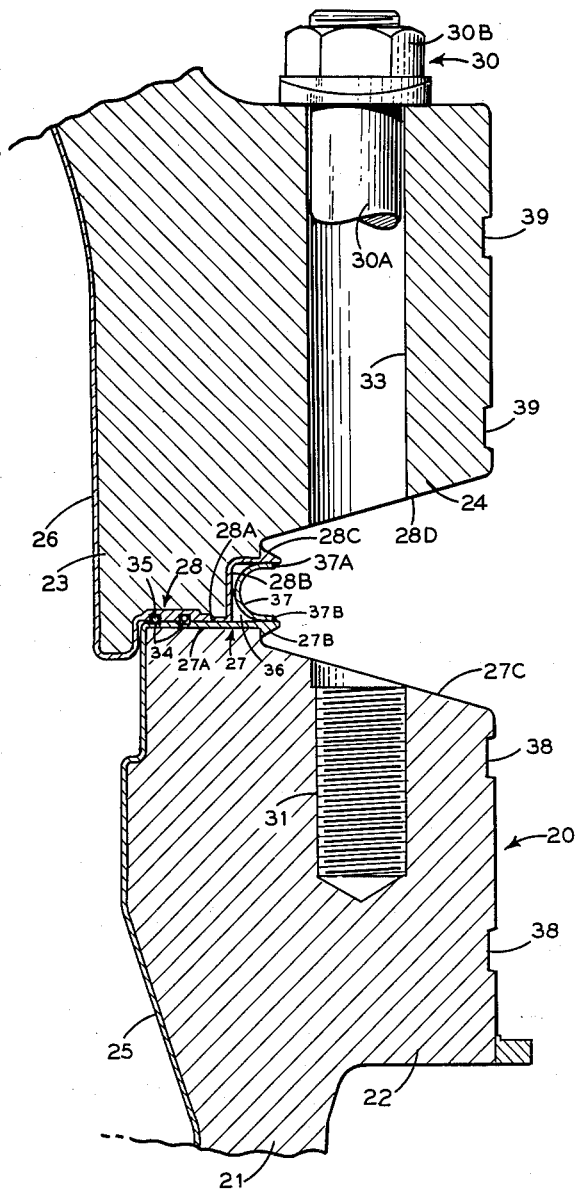

Referring to FIG. 1, there is illustrated a fragmentary portion of a pressure vessel 20 comprising an elongated cylindrical body 21 open at one end and closed at the other, as for example by a hemispherical end piece, not shown. In the illustrated form, the wall of the vessel body adjacent its open end is reinforced as by a thickened portion or flange 22. A removable cover or closure 23 of generally hemispherical shape is provided to close the open end of the vessel. The closure 23 is likewise formed with a thickened portion or flange 24 which is arranged to engageably match or mate with the flange 22 of the vessel body 21.

A corrosion resistant cladding or lining 25, 26 is integrally attached to the inner surface of the pressure vessel body and closure, respectively. The mating or matching surface 27 of the vessel at the junction between the vessel body 21 and its closure 23 includes a contact portion 27A, a connected downwardly step portion 27B, and a laterally extending non-contacting portion 27C. The mating surface 28 of the closure member 23 is provided with a complementary contacting portion 28A, a stepped portion 28B provided with a lateral offset 28C, and a laterally extending non-contacting portion 28D opposite the non-contacting portion 27C of the body 21. Both contacting portions 27A, 28A, of the body 21 and the closure 23, respectively, extend radially outward from the inner surface of the vessel body and closure with the contacting portion 27A of the vessel body 21 extending outwardly a slight distance beyond the outer edge of the contact portion 28A of the closure.

The non-contacting surface portions 27C and 28D are generally disposed in opposing and outwardly diverging relationship to form therebetween an annular open gap 29. A plurality of nut and bolt assemblies 30 are provided for detachably securing the closure member 23 to the vessel body 21. To accommodate such bolts the flange 22 of the pressure vessel body 21 is provided with a plurality of tapped holes 31, and the flange 24 of the closure 23 is formed with a plurality of bolt holes 33 arranged in alignment with the tapped holes 31 for receiving the bolts 30A. Corresponding nuts 30B threaded to each end of the bolts exert the force required to draw the vessel body 21 and closure 23 into compressed sealing relationship.

To deter possible leakage of fluid at the junction of the vessel body and closure the contacting surfaces 27A, 28A are formed with one or more grooves or seats 34 to accommodate a flexible gasket 35, as for example an O ring.

Within the circle of bolts 30A and between the mating surfaces 27 and 28 there is formed an annular groove 36 which opens to the gap 29. To positively insure against any possibility of leakage from occurring at the junction of the vessel body 21 and the closure 23, an annular arcuate-shaped, flexible metallic membrane 37 is positioned in the groove 36 to circumscribe the line of juncture. As shown, the membrane 37 has a cross-section which defines a segment of a circle and is arranged within groove 36 so that its convex surface extends toward the interior of the vessel. The cross-sectional ends 37A, 37B of the membrane 37 are recessed within the groove 36 and are seal welded to the cover and vessel body to provide an absolutely fluid-tight pressure seal at the junction when the vessel is placed in operation. It will be observed that when the sealing membrane 37 is welded in position, access to the interior of the vessel cannot be had without first cutting or otherwise removing the sealing membrane 37.

Since access must be had to the interior of the vessel 20 at periodic intervals a means must be provided to facilitate the cutting or removal of the metallic membrane. To attain the necessary access, removal of the metallic membrane 37 is had by a milling operation, upon the removal of the bolt and nut assemblies, to cut away the weld deposit of the membrane 37 which then permits separation of the closure from the vessel body.

Figure 2:
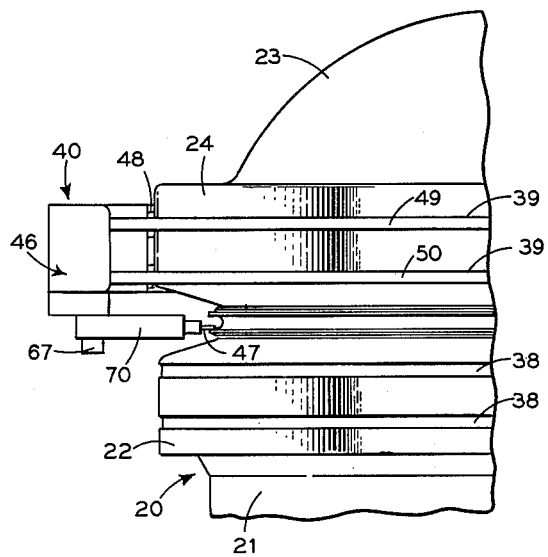
FIG. 2 is a partial elevation view illustrating the general arrangement of the pressure vessel of FIG. 1 in combination with a seal weld cutting machine.

In accordance with this invention, means are provided to enhance the milling operation and to support the milling or cutting tool on either the pressure vessel body 21 or its closure 23 adjacent the seal weld of membrane 37. These means comprise a pair of circumferentially extending grooves 38, 39 machined directly into the outer periphery of the vessel body flange 22 or closure flange 24, respectively. As will be hereinafter described, these grooves provide a permanent track or guide for the seal weld cutting machine 40, as seen in FIG. 2.

Figure 3:
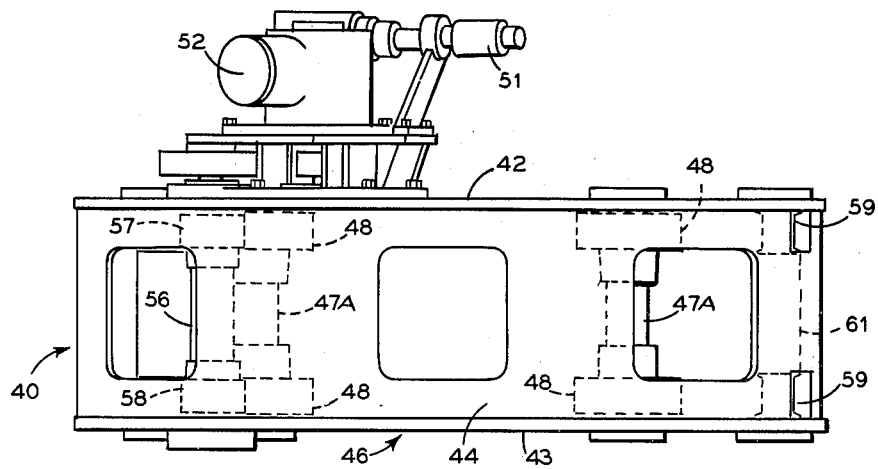
FIG. 3 is a detail elevation view of the carriage of the seal weld cutting machine.
Figure 4:
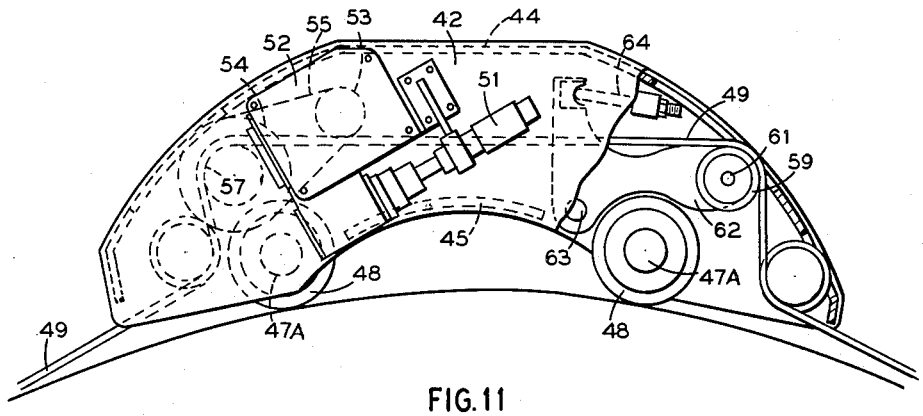
FIG. 4 is a top plan view of FIG. 3 with a portion broken away.

Referring to FIGS. 3 and 4, the seal weld cutting machine or milling machine 40 comprises a frame having substantially crescent shaped, spaced, top and bottom plates 42, 43, respectively, connected by spaced arcuate shaped side members 44, 45 to define a carriage 46 which conveys the cutting head or tool 47 around the vessel 20 on the tracks 38 or 39 integrally formed therein.

Vertically disposed adjacent each end of the carriage and supported between the top and bottom plates 42, 43 is an axle 47A on which there is rotatably mounted a pair of wheels or rollers 48 arranged to travel in the grooves 38 or 39 provided in either the flange or the closure of the vessel body.

Supporting the machine in position on the side of the vessel are two silent chains 49 and 50 tensioned onto the tracking grooves 38 or 39. As shown in FIG. 2, the chains 49 and 50 are tensioned in grooves 39 of the closure 23. The chains 49, 50 also provide the means by which the carriage 40 is pulled about the track groove on the vessel. Thus it will be noted that the weight of the machine 40 is supported entirely by the tracking wheels 48 traveling in either pair of grooves 38 or 39 and the two silent chains 49, 50 embracing the vessel within the grooves.

Means for driving the carriage 46 include an air motor 51 connected to a suitable drive reducer 52 mounted on the top plate 42 of the carriage 40. Further reduction may be attained by connecting a relatively small diameter drive sprocket 53 to a reducer worm gear drive for driving a relatively larger diameter sprocket 54 connected thereto through the medium of a suitable drive chain or belt 55. The driven sprocket 54 is mounted on a jackshaft 56 which is equipped with two spaced apart drive sprockets 57, 58 arranged to engage each of the silent chains 49 and 50, respectively, which drive the carriage around the track when actuated. Each of the silent chains is also threaded around a respective spaced apart driven sprocket 59 connected to a common shaft 61 which in turn is secured to a movable bellcrank 62 pivoted to the carriage at 63. The bellcrank arm 62 is thus rendered readily adjustable by means of a suitable adjusting screw 64 for adjusting the required tension in each of chains 49 and 50.

Figure 6:
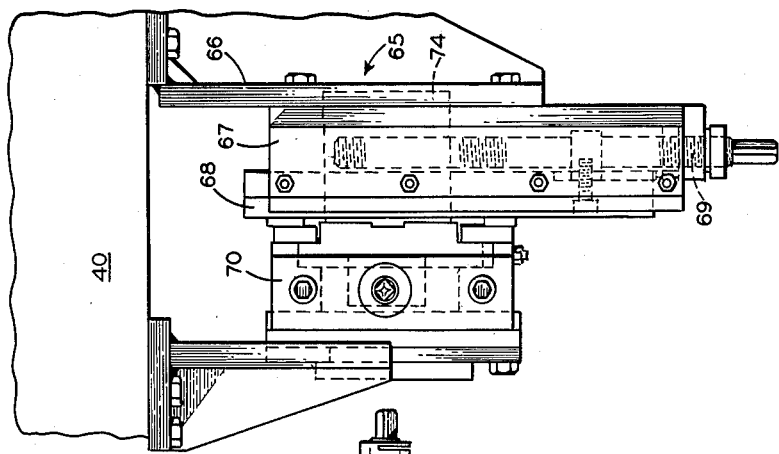
FIG. 6 is an end view of FIG. 5.
Figure 5:
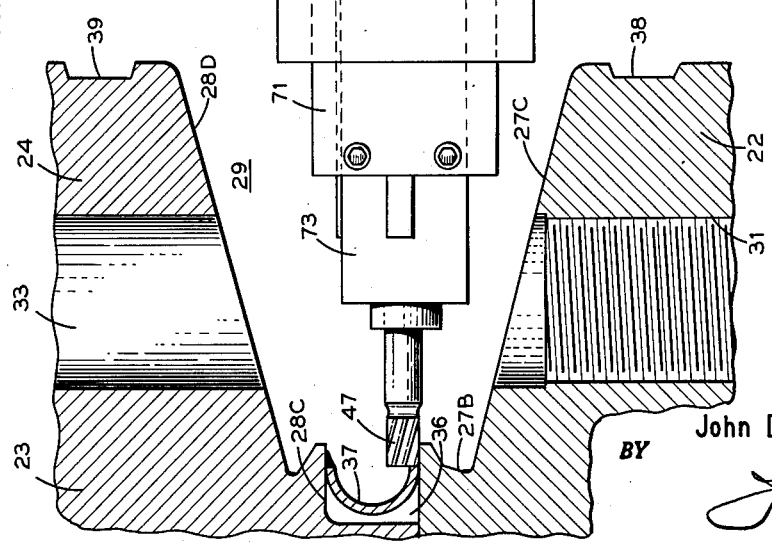
FIG. 5 is a side elevation view of an enlarged detail of the cutting tool carried by the carriage of FIGS. 3 and 4.

As shown in FIGS. 5 and 6, a cutting tool assembly 65 is secured to the bottom plate 43 of the carriage 40. In accordance with this invention the cutting head or tool 47 is adjustably mounted for movement in both a vertical direction and a horizontal direction. For rendering the cutting head 47 so adjustable the tool assembly includes a dependingly supported bracket 66 to which there is secured a vertically disposed U-shaped guideway 67. Positioned in the guideway 67 is a vertically movable slide 68. Vertical adjustment of the slide 68 relative to guideway 67 is had by means of an adjusting screw 69 threaded to slide 68. Thus depending upon the rotation of screw 69, the slide 68 is rendered readily adjustable in a vertical plane.

Connected to slide 68 at right-angles thereto is a second U-shaped guideway 70 in which a slide 71 is movably positioned therein for adjustment in a horizontal plane. Adjustment of slide 71 toward and away from the vessel is attained by adjusting screw 72 threaded to slide 71.

The cutting head or tool 47 is connected in a spindle housing 73 attached to the inner end of slide 71, and attached to the spindle housing 71 is a mounting plate for supporting an air motor 74 which forms the drive means for means for the tool spindle, see FIG. 6. Thus it will be apparent that by proper adjustment of each of the adjusting screws 69 and 72, the cutting head 47 can be properly positioned as shown in FIG. 5 to cut or mill away the weld which secures the membrane 37 to the vessel body 21. Thus when this weld has been cut the closure can then be removed and access attained to the interior of the vessel.

Figure 11:
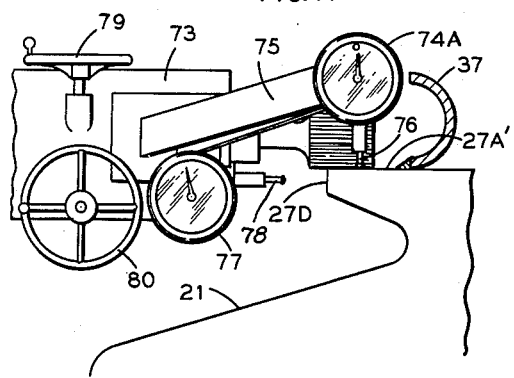
FIG. 11 is a detail view illustrating the indicator assembly utilized in conjunction with the cutting tool for gauging the depth of cut.

In order to maintain the desired depth of cut and the desired vertical alignment, a dial indicator is connected to the spindle housing to gauge the depth of cut. As shown in FIG. 11 a dial indicator 74A is connected to the spindle housing 73 by suitable brackets 75 and it is provided with a feeler 76 adapted to engage the extended surface 27A′ to indicate the vertical depth of the cut. A second dial indicator 77 is provided to indicate the radial depth of the cut. This indicator 77 is provided with a feeler 78 arranged to engage the edge surface 27D of the vessel body 21 for measuring the radial depth of a cut. With the arrangement described, the grooves or tracks 38 or 39 in the vessel 70 are not required to be absolutely accurate to attain the proper cut since an accurate cut can be readily maintained simply by seeing to it that the dial indicators read zero as the machine progresses around the vessel. The arrangement is such that the cutter is maintained in a given plane, but the carriage is allowed to wander. Manipulation of the carriage to maintain the dial readings at zero is had through appropriate hand wheels 79 and 80.

Figure 8:
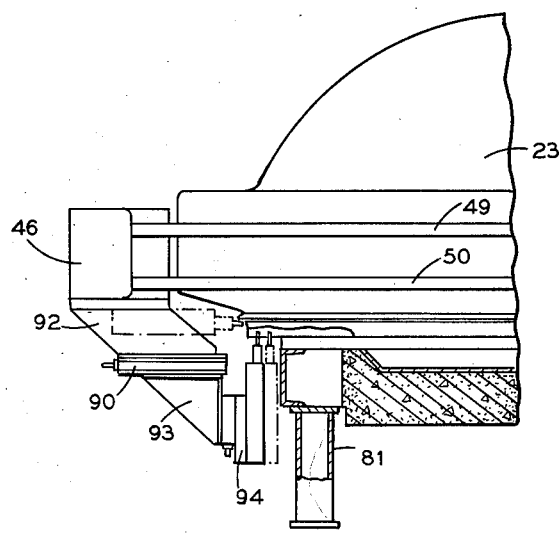
FIG. 8 illustrates the modified arrangement utilized in conjunction with the closure of vessel for performing a spot refinishing operation on the sealing surface thereof.

FIGS. 8, 9 and 10 illustrate a modified form of the invention. In this form of the invention the cutting tool is adapted to perform a refinishing or spot finishing operation on either the contacting surfaces 27A or 28B of the vessel body or closure, respectively. In FIGS. 8, 9 and 10 the cutting tool is illustrated in position for a refinishing operation on the contacting surface 28A of the vessel closure member 23, which has been removed from the vessel and is supported on a suitable stand 81.

Referring to FIGS. 9 and 10, it will be observed that a guideway 90 with a slide 91 movably mounted therein is connected to a bracket 92 dependently supported from the carriage 46. Connected to slide 91 is a right-angled plate 93. Secured to the vertical edge 93A of plate 93 is a second U-shaped guideway 94 in which there is mounted slide 95 connected for movement in a vertical plane. As shown, the spindle housing 96 and cutting tool head 97 connected thereto are in turn connected to slide 95 for movement therewith. Thus it will be observed that adjustment of the tool head 97 to the positions indicated by the dot-dash line in FIG. 9 is had by appropriate manipulation of the adjusting screws 90A and 94A for controlling the position of slides 91 and 95, respectively, which are each threaded to the respective slides as hereinbefore described. An air motor 98 is provided as a drive means for the tool 97. Not shown in FIGS. 9 and 10 are the indicators for gauging the radial and vertical depth of cut, however, it will be understood that the indicators as described are equally adapted to the spindle head of this modification as herein described with reference to FIG. 11.

Figure 7:
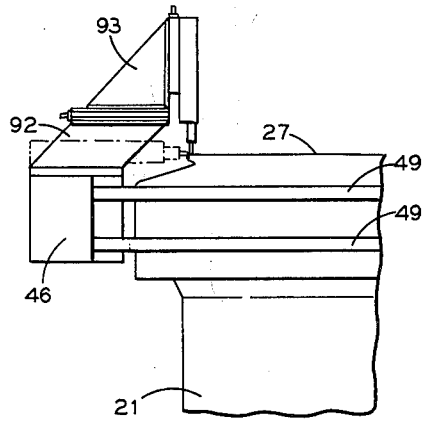
FIG. 7 illustrates a modified arrangement of the invention in which the cutting tool is utilized to perform a spot refinishing operation on the sealing surface of the vessel body.

The arrangement of the carriage and tool assembly of FIG. 7 is similar to that described with reference to FIGS. 9 and 10 with the exception that the assembly is inverted to position it for performing the refinishing operation on the contact surface 27 of vessel body 21. In all other respects this arrangement is similar to that described with reference to FIGS. 9 and 10.

While in accordance with the provisions of the statutes there is illustrated and described herein the best form and mode of operation of the invention now known to the invention, those skilled in the art will understand that changes may be made in the form of the apparatus disclosed without departing from the spirit of the invention covered by the claims, and that certain features of the invention may sometimes be used to advantage without a corresponding use of other features.

What I claim is:

1. In a pressure vessel adapted to be opened and closed and having a body member provided with an opening therein, a removable closure member arranged in normal operative position to register with and close said opening, each of said members having a longitudinally extending outer surface, and a sealing membrane circumscribing the junction formed between said body and said closure members and welded thereto to form a fluid-tight seal therebetween, one of said members being formed with a circumferentially extending annular groove in the longitudinally extending outer surface thereof, said groove having a circumferential center line lying in a single plane and defining a trackway spaced from said sealing membrane and adapted to guide and support a seal weld cutting machine therein.

2. In combination a pressure vessel comprising a body member provided with an opening therein, a removable closure member arranged in normal operative position to register with and close said opening, a flexible sealing membrane circumscribing the junction formed between said body and said closure members, said flexible membrane being integrally connected to said body and said closure members in said closed position thereof, one of siad members having a circumferentially extending annular groove integrally formed therein and having a circumferential center line lying in a single plane, and a machine for cutting said membrane to permit removal of said closure, said machine being movably mounted on said one member to travel in said groove.

3. In combination a pressure vessel adapted to be opened and closed comprising a body member provided with an opening therein, a removable closure member arranged in normal operative position to register with and close said opening, said body and closure members having upright relatively thick walls, means for exerting a compressive force between said closure and body members, a flexible sealing membrane circumscribing the junction formed between said body and said closure members in the closed position thereof, one of said members having a circumferentially extending annular groove integrally formed in the outer surface thereof, said groove having a circumferential center line lying in a single horizontal plane, and a machine supported on the outer surface of said one member for cutting said membrane to permit removal of said closure, said machine being connected to travel in said groove on said upright relatively thick wall.

4. In combination a pressure vessel adapted to be opened and closed comprising a body member provided with an opening therein, a removable closure member arranged in normal operative position to register with and close said opening, means for exerting a compressive force between said closure and said body, a flexible sealing membrane circumscribing the junction formed between said body and said closure members, said flexible membrane being integrally connected to said body and said closure in the closed position thereof, means including a groove having a circumferential center line lying in a single plane defining a circumferentially extending annular track integrally formed in the outer wall surface of one of said members, and a machine having a tool carriage movably supported on said outer surface of said one member, said carriage being arranged to travel in said track, and a tool supported on said carriage to cut said flexible membrane.

5. In combination a pressure vessel adapted to be opened and closed comprising a body member provided with an opening therein, a removable closure member arranged in normal operative position to register with and close said opening, means for exerting a compressive force between said closure and said body, a flexible sealing membrane circumscribing the junction formed between said body and said closure members, said flexible membrane being seal welded to said body and said closure members in the closed position thereof, a seal weld cutting machine movably mounted on one of said members, said machine including a carriage, a cutting tool adjustably connected to said carriage to engage said membrane, means for movably securing said carriage to said one member, said securing means including a circumferentially extending annular groove integrally formed on said one member, said groove having a circumferential center line lying in a single plane, tracking wheels connected to said carriage and arranged to travel in said groove, and a flexible drive means to support and move said carriage relative to said one member, and means for tensioning said drive means into said tracking groove.

6. In combination a pressure vessel adapted to be opened and closed comprising a body member provided with an opening in an end thereof arranged normal to the longitudinal axis of said body member, a removable flanged closure member arranged in normal operative position to register with and close said opening, means for exerting a compressive force between said flanged closure and said body, a flexible sealing membrane circumscribing the junction formed between said body and said flange closure members, said flexible membrane being integrally connected to said body and said closure members, a membrane cutting machine connected to one of said members, said machine including a carriage, a cutting tool adjustably connected to said carriage to engage said membrane, means for movably securing said carriage to the said one member, said securing means including a plurality of parallel circumferentially extending annular grooves integrally formed on said one member, each of said grooves having a circumferential center line each of which lies in a single transverse plane, tracking wheels connected to said carriage and arranged to travel in said grooves, a flexible drive means to support and move said carriage relative to said one member, and means for tensioning said drive means into said tracking grooves.

7. In combination a pressure vessel adapted to be opened and closed comprising a body member provided with an opening in an end thereof arranged normal to the longitudinal axis of said body member, a removable flanged closure member arranged in normal operative position to register with and close said opening, means for exerting a compressive force between said flanged closure and said body, a flexible sealing membrane circumscribing said junction formed between said body and said closure members, said flexible membrane being integrally connected to said body and said closure members to form a seal therebetween, a cutting machine to break said seal, said machine including a carriage movably mounted on one of said members, a cutting tool adjustably connected to said carriage to engage said membrane, means for movably securing said cutting machine to said one member, said securing means including a circumferentially extending annular groove integrally formed in the periphery of said surface of said member adjacent the junction between said body and said flanged closure, said groove having a circumferential center line extending in a single plane perpendicular to said longitudinal axis of said member, tracking wheels connected to said carriage and arranged to travel in said groove, and a flexible drive means for supporting the weight of said carriage on said one member, means for tensioning said drive means into said tracking groove, and means actuating said drive means for moving said carriage around said track.

References Cited in the file of this patent

UNITED STATES PATENTS

| | | |
|---|---|---|
| 687,939 | Moore | Dec. 3, 1901 |
| 1,958,582 | Kerr et al. | May 15, 1934 |
| 2,196,181 | Arneson | Apr. 9, 1940 |
| 2,311,001 | Stewart | Feb. 16, 1943 |
| 2,805,789 | Kreh et al. | Sept. 10, 1957 |
| 2,857,073 | Tinker | Oct. 21, 1958 |
| 2,893,757 | Holmes | July 7, 1959 |

FOREIGN PATENTS

| | | |
|---|---|---|
| 846,576 | Great Britain | Aug. 31, 1960 |